United States Patent [19]

Doering

[11] Patent Number: 4,548,362

[45] Date of Patent: Oct. 22, 1985

[54] MATERIAL SPREADER

[75] Inventor: Charles W. Doering, Louisville, Ky.

[73] Assignee: Brinly-Hardy Co., Inc., Louisville, Ky.

[21] Appl. No.: 566,536

[22] Filed: Dec. 29, 1983

[51] Int. Cl.⁴ .............................................. A01C 17/00
[52] U.S. Cl. ................................... 239/685; 239/687; 222/545
[58] Field of Search ............... 239/661, 665, 681, 683, 239/684, 685, 687; 222/502, 545

[56] References Cited

U.S. PATENT DOCUMENTS

| 332,506 | 12/1885 | Eberhart | 239/665 |
| 3,807,643 | 4/1974 | Bowerman | 239/683 |
| 3,899,138 | 8/1975 | van der Lely et al. | 239/661 |

*Primary Examiner*—Andres Kashnikow
*Assistant Examiner*—Mary Beth O. Jones
*Attorney, Agent, or Firm*—Frank C. Leach, Jr.

[57] ABSTRACT

A material spreader includes a hopper having an opening in its bottom through which material flows to a rotatable fan, which is driven from one of a pair of support wheels for the hopper during pushing or pulling of the spreader across the ground, for spreading the material. A gate, which is pivotal about the same axis as the axis about which the fan rotates, has an opening, which is smaller than the opening in the hopper, to control the portion of the opening in the hopper through which the material flows to control the spread pattern produced by rotation of the fan. A shutter, which is disposed beneath the gate, has an opening, which is smaller than the opening in the gate, cooperating with the opening in the gate to control the rate of flow from the hopper. The gate has a first arcuate slot therein within which is disposed a bolt supported by the hopper to limit pivoting of the gate. A wing nut cooperates with the bolt to lock the gate in the desired position without affecting movement of the shutter. A second arcuate slot in the gate has a bolt, which is supported by the gate, disposed therein with a wing nut cooperating with the bolt to lock a bushing on the bolt in engagement with the shutter to hold the shutter in its desired position while also preventing inadvertent movement of the shutter beyond its desired position.

7 Claims, 15 Drawing Figures

MATERIAL SPREADER

This invention relates to a material spreader and, more particularly, to a spreader capable of being pushed or pulled and having both its spread pattern and flow rate independently controlled.

Presently available material spreaders are used for spreading material such as grass seed, fertilizer, sand, or ice melters, for example, over the ground in a controlled spread pattern. The material spreaders also have the flow rate of the material controlled.

Presently available material spreaders are capable of controlling the spread pattern and the flow rate only for motion of the spreader in one direction. That is, the material spreaders are designed for either being pulled or pushed. The material spreader of the present invention is an improvement of presently available material spreaders in that the material spreader of the present invention can be pushed or pulled while still obtaining both a desired spread pattern and a desired flow rate.

The material spreader of the present invention controls the spread pattern and the flow rate irrespective of whether the spreader is being pulled or pushed through providing a unique arrangement for separately controlling each of the spread pattern and the flow rate. The material spreader of the present invention also utilizes a unique driving arrangement so that the spreading means is rotated irrespective of whether the spreader is pulled or pushed although the direction of rotation of the spreading means is in the opposite direction when being pushed in comparison with being pulled.

An object of this invention is to provide a material spreader that can be pulled or pushed and still obtain a desired spread pattern.

Another object of this invention is to provide a material spreader having a unique arrangement for controlling the flow rate and the spread pattern independently of each other.

Other objects of this invention will be readily perceived from the following description, claims, and drawings.

This invention relates to a material spreader for spreading material in a specific pattern at a selected flow rate including a hopper for containing material to be spread and support means to support the hopper for movement along the ground through either pushing or pulling. Spreading means, which is disposed beneath the hopper to receive material for spreading, is rotated at a selected rate of rotation by rotating means as the support means is moved along the ground. The hopper has an opening in its bottom for material to flow therethrough from the hopper to the spreading means. Control means, which controls the portion of the opening in the hopper through which the material flows, includes first means pivotally mounted for movement about a pivot axis to control the portion of the opening in the hopper that is open for material to flow therethrough from the hopper to control the spread pattern and second means pivotally mounted for movement about the pivot axis to control the size of the portion of the opening in the hopper that is open by the position of the first means to control the flow rate therethrough. The first means of the control means comprises a gate having an opening therein of a selected size smaller than the opening in the hopper with the gate being mounted for pivotal movement about the pivot axis to move the opening in the gate relative to the opening in the hopper to control the spread pattern of material from the hopper by controlling the portion of the opening in the hopper through which the material flows. The second means of the control means comprises a shutter having an opening therein of a selected size smaller than the opening in the gate with the shutter being pivotally mounted for pivotal movement about the pivot axis independently of the gate to move the opening in the shutter relative to the opening in the gate to control the rate of flow of material from the hopper through the opening in the gate. Limiting means, which limit pivoting of the gate about the pivot axis, includes a first arcuate slot in the gate formed on a first radius having the pivot axis as its center and means supported by the hopper and disposed in the first arcuate slot in the gate to limit pivoting of the gate about the pivot axis to the arcuate length of the first arcuate slot in the gate. Holding means, which holds the shutter in the position to which it is moved while preventing pivoting of the shutter about the pivot axis beyond a desired limit, includes a second arcuate slot in the gate formed on a second radius having the pivot axis as its center and means supported by the gate and disposed in the second arcuate slot in the gate with the supported means being selectively movable to any portion of the second arcuate slot in the gate and being retained at any position to which it is moved. The shutter carries means disposed in the second arcuate slot in the gate to engage the supported means in the second arcuate slot in the gate so that the shutter is held in the position to which it is moved while pivoting of the shutter about the pivot axis beyond a desired limit is prevented.

The attached drawings illustrate a preferred embodiment of the invention, in which.

Figure 1:
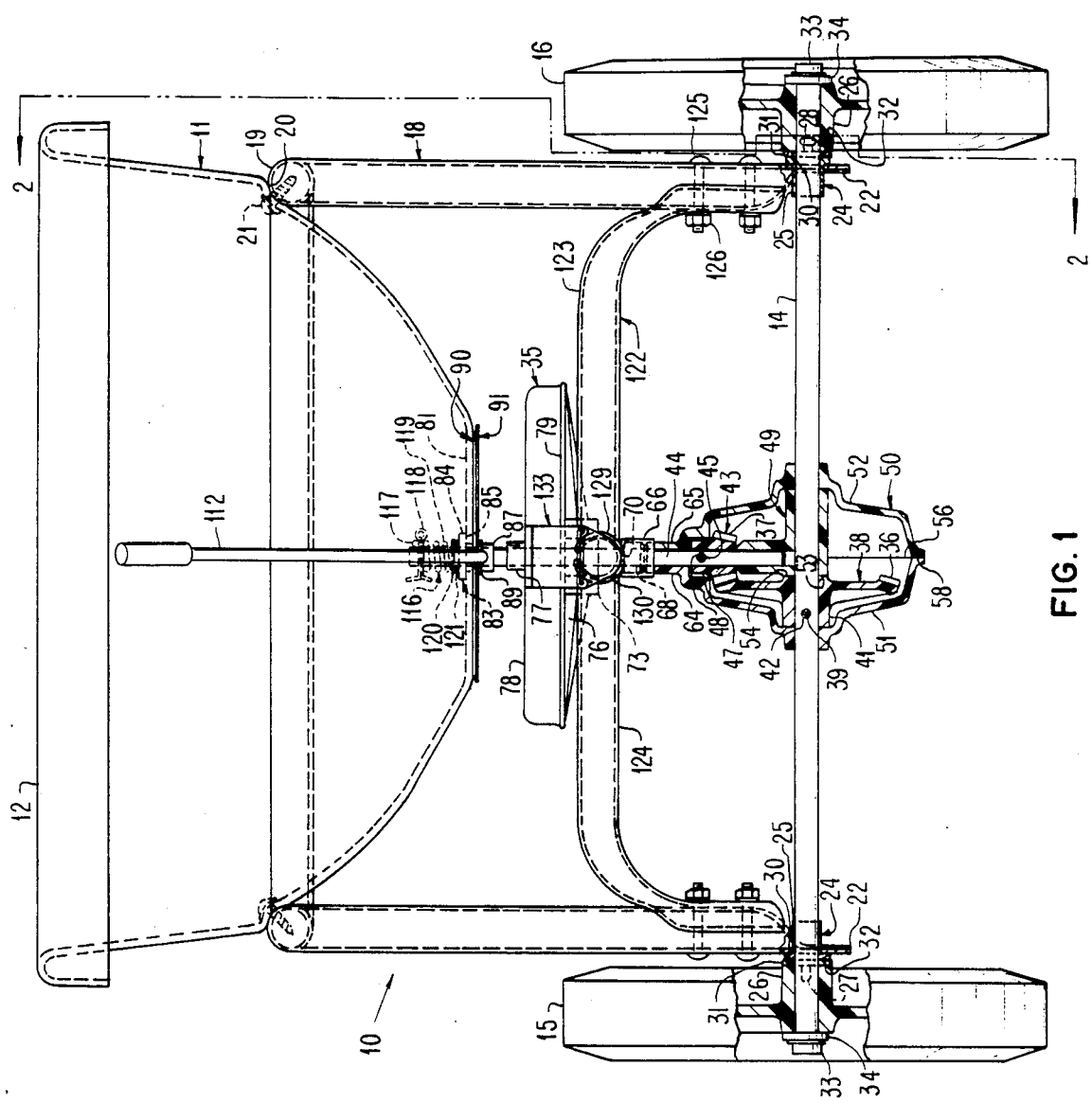
FIG. 1 is a front elevational view, partly in section, of a material spreader of the present invention.
Figure 3:
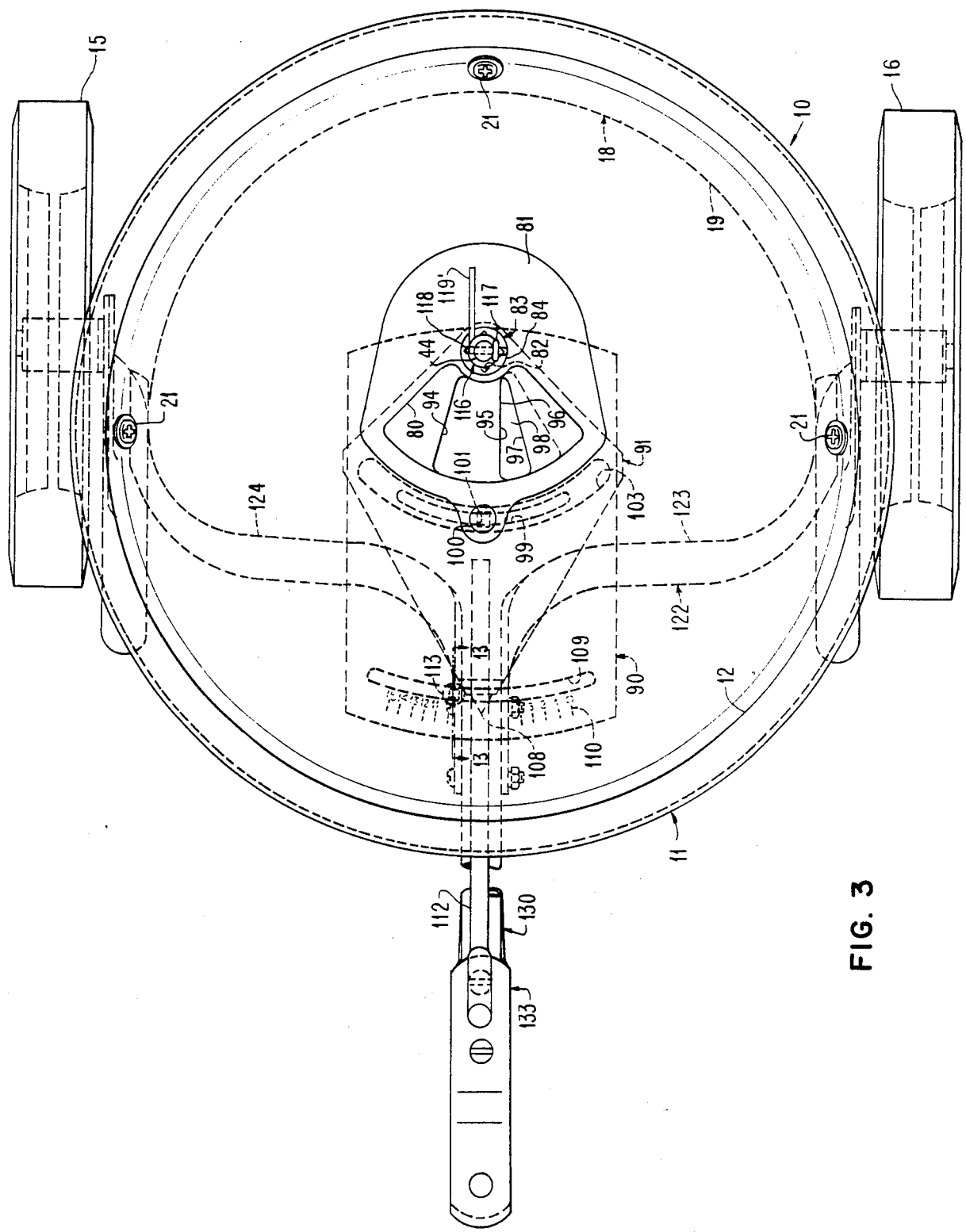
FIG. 3 is a top plan view of the material spreader of FIG. 1.

Referring to the drawings and particularly FIG. 1, there is shown a material spreader 10 for spreading material such as grass seed, fertilizer, sand, and ice melters, for example, on the ground in various desired spread patterns at various selected flow rates. The material spreader 10 includes a hopper 11 having an open top 12, which is circular in shape as shown in FIG. 3, to enable supply to the hopper 11 of the material to be spread.

The hopper 11 is supported in spaced relation to an axle 14 (see FIG. 1), which has wheels 15 and 16 for rolling along the ground, by a hopper support 18. The hopper support 18 is a hollow tube bent into the shape shown in FIG. 4 so as to have a substantially horizontal upper portion 19 disposed beneath a portion slightly greater than 180° of an outer support surface 20 (see FIG. 1) of the hopper 11 extending around the periphery of the hopper 11. Thread cutting screws 21 extend through the wall of the hopper 11 and into three openings 22 (see FIG. 4), which are spaced about 90° from each other, in the portion 19 of the hopper support 18 to attach the hopper 11 (see FIG. 1) to the hopper support 18.

Figure 4:
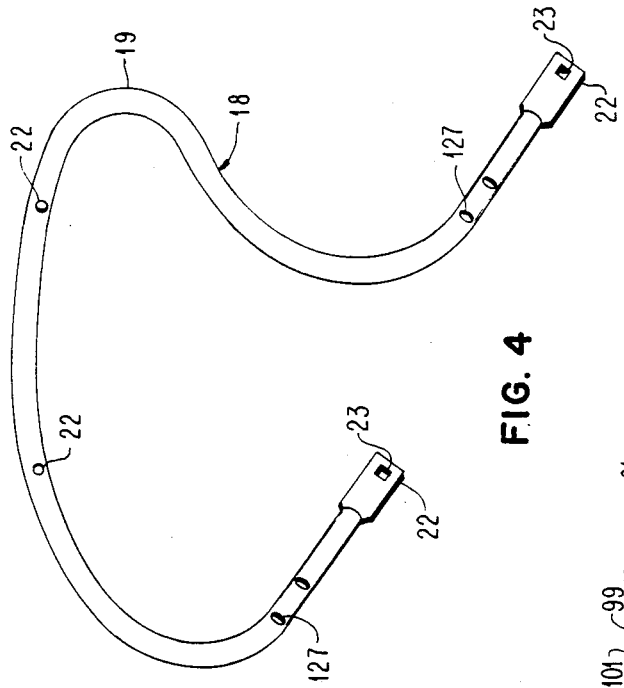
FIG. 4 is a perspective view of a hopper support of the material spreader of FIG. 1.

As shown in FIG. 4, the hopper support 18 has each of its ends 22 flattened. Each of the ends 22 has a square shaped opening 23 threaded to fit over a shoulder bearing 24 (see FIG. 1). The shoulder bearings 24 are mounted on the axle 14 adjacent its ends.

Each of the shoulder bearings 24, which is formed of a suitable material such as nylon, for example, so as to not require any lubrication, includes a hollow portion 25 having a square shaped outer surface to fit within the square shaped opening 23 (see FIG. 4) in one of the flattened ends 22 of the hopper support 18 and a round inner surface to fit over the axle 14 (see FIG. 1). This mounts the hopper support 18 on the axle 14 without any rotation of the hopper support 18 when the axle 14 is rotated therein.

Each of the wheels 15 and 16 is the same. Each of the wheels 15 and 16 has a hub 26 for mounting on an end of the axle 14. Each of the hubs 26 has diametrically disposed slots 27 formed in its inner end. The slots 27 enable a cotter pin 28 to extend through one of the slots 27 in the wheel 16, a passage 29 (see FIG. 2) extending through the axle 14, and the other of the slots 27 (see FIG. 1) in the wheel 16 to attach the wheel 16 to the axle 14 so that the axle 14 is rotated during rotation of the wheel 16. The wheel 15 freely rotates on the axle 14. It should be understood that the wheel 15 could be so attached to the axle 14, if desired, rather than the wheel 16. To avoid stress during turning, it is not desired to have both of the wheels 15 and 16 connected to the axle 14.

The hub 26 of each of the wheels 15 and 16 has its inner end 30 bearing against a washer 31. The washer 31 bears against outer end surface 32 of the shoulder bearing 24. Thus, each of the wheels 15 and 16 is spaced from the adjacent shoulder bearing 24 by one of the washers 31.

Each of the wheels 15 and 16 is retained on the axle 14 by a push nut 33. A washer 34 is disposed between the push nut 33 and the wheel 15 or 16.

Accordingly, the wheel 15 freely rotates on the axle 14 when the axle 14 is rotated by the wheel 16 rolling along the ground. The rotation of the axle 14 is transmitted to a fan 35, which spreads the material within the hopper 11 when the material is released from the hopper 11.

The transmission of the rotation from the axle 14 to the fan 35 includes a bevel gear 36, which is formed of a suitable plastic or metal, cooperating with a pinion gear 37, which is formed of a suitable plastic or metal. The bevel gear 36 is part of a bevel gear assembly 38, which is secured to the axle 14 by a pin 39 passing through aligned openings in opposite sides of a hub 41 of the bevel gear assembly 38 and a passage 42 extending through the axle 14.

The pinion gear 37 is part of a pinion gear assembly 43, which is attached to a vertical shaft 44 by a pin 45. The pin 45 extends through aligned openings in a hub 47 of the gear assembly 43 and a passage 48 in the shaft 44. The ratio of the teeth of the bevel gear 36 to the pinion gear 37 is such that the shaft 44 rotates at four times the speed of rotation of the axle 14.

The shaft 44 has its bottom end rotatably supported in a carrier 49, which is mounted on the axle 14 but does not rotate therewith. The carrier 49 is formed of a suitable plastic to allow rotation of the axle 14 relative thereto without any requirement of a lubricant.

A gear box housing 50, which comprises two separate portions or halves 51 and 52 that are identical parts designed to mate when positioned flange to flange, surrounds the bevel gear assembly 38 and the pinion gear assembly 43. The gear box housing 50 holds an end surface 53 of the carrier 49 against an end surface 54 of the bevel gear assembly 38, which is fixed to the axle 14 by the pin 39.

Figure 5:
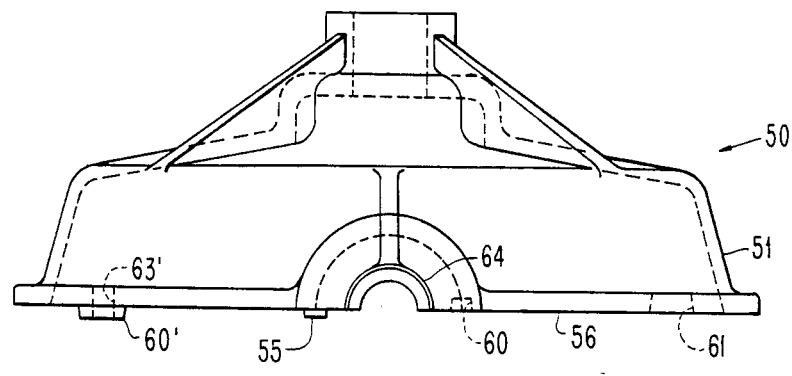
FIG. 5 is a top plan view of one half of a gear box housing of the, material spreader of FIG. 1.

As shown in FIG. 5, the portion 51 of the gear box housing 50 includes a projection 55 extending from a mating surface 56 of the portion 51 for disposition within a hole 57 (see FIG. 2) in a mating surface 58 of the portion 52. A projection 59 extends from the mating surface 58 of the portion 52 for disposition in a hole 60 (see FIG. 5) in the mating surface 56 of the portion 51. The mating surface 56 of the portion 51 also has a pair of angled projections 60' extending therefrom and a pair of angled holes 61 therein. The projections 60' are disposed in a pair of holes, which are the same shape as the holes 61, in the mating surface 58 (see FIG. 2) of the portion 52. The holes 61 (see FIG. 5) in the mating surface 56 of the portion 51 receive angled projections 62 (see FIG. 2) on the mating surface 58 of the portion 52.

This mates the portions 51 (see FIG. 1) and 52 of the gear box housing 50 to each other in the desired relation with the mating surfaces 56 and 58 abutting each other through 360°. With the mating surfaces 56 and 58 of the portions 51 and 52, respectively, abutting each other, cutting screws 63 (see FIG. 2) are screwed into passages 63' (see FIG. 5) in the projections 60' and into corresponding passages (not shown) in the projections 62 (see FIG. 2) to attach the portions 51 (see FIG. 1) and 52 to each other.

The portion 51 of the gear box housing 50 includes an upstanding hollow semi-cylindrical portion 64 cooperating with an upstanding hollow semi-cylindrical portion 65 of the portion 52 to form a hollow cylindrical tube to rotatably support a portion of the vertical shaft 44. The upstanding hollow semi-cylindrical portions 64 and 65 of the portions 51 and 52, respectively, of the gear box housing 50 are held against each other by a cap 66, which is formed of a suitable plastic material so as to be resilient and has a snap fit over the upper ends of the semi-cylindrical portions 64 and 65. The cap 66 has an inner annular pointed element 67 (see FIG. 2) for disposition within grooves 68 (see FIG. 1) and 69 (see FIG. 2) in the semi-cylindrical portions 64 (see FIG. 1) and 65, respectively. The cap 66 has an opening 70 at its upper end through which the vertical shaft 44 passes so that the cap 66 does not rotate with the vertical shaft 44.

Figure 6:
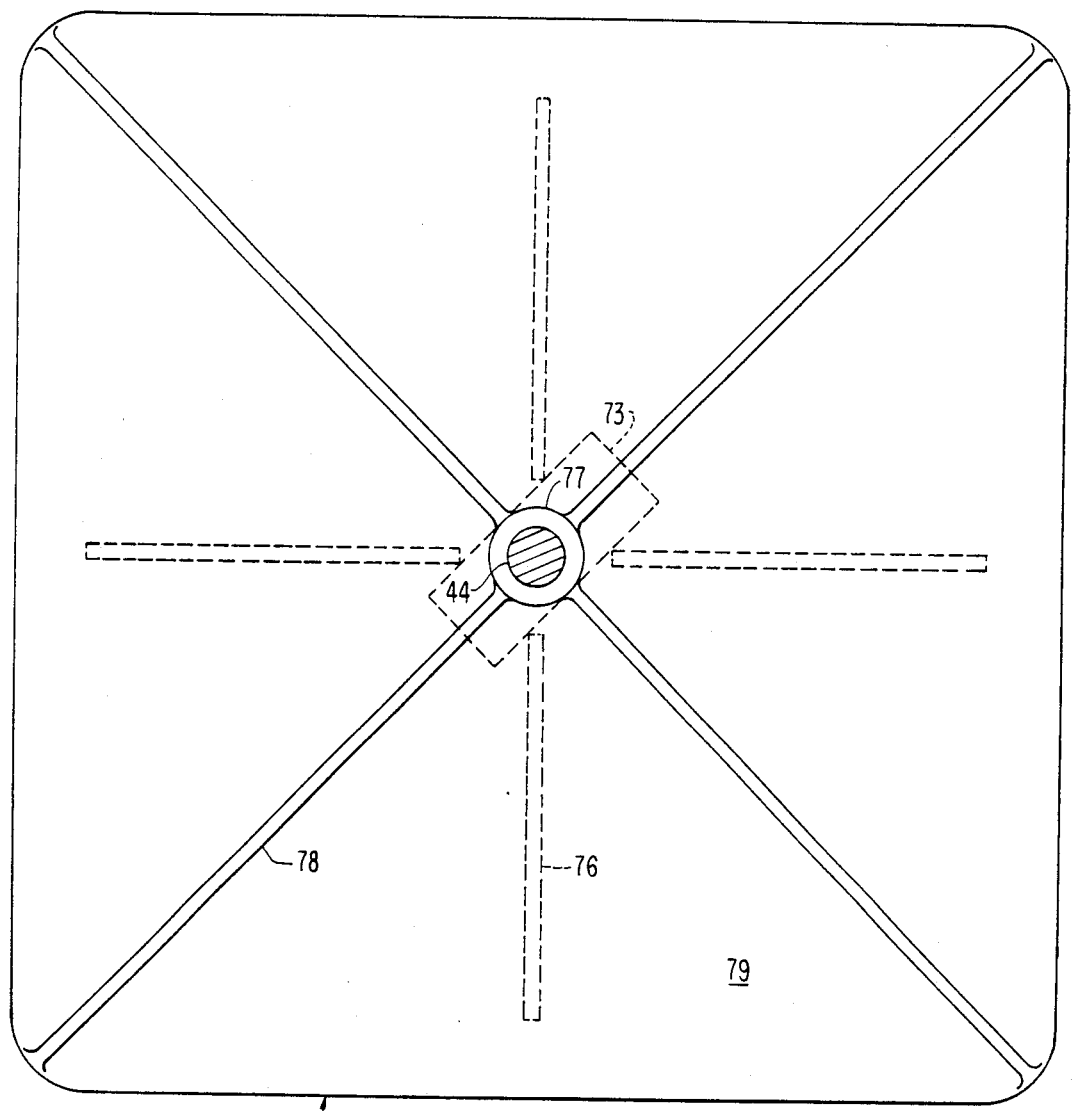
FIG. 6 is a top plan view of a fan of the material spreader of FIG. 1 used to fling the material to be spread and showing a friction type driver for rotating the fan.

The vertical shaft 44 has a driver 73 fitted thereon for rotation therewith. The driver 73, which is rectangular shaped as shown in FIG. 6, is formed of a suitable elastomeric or resilient material and grips the shaft 44 (see FIG. 2) because a passage 74 in the driver 73 is smaller than the shaft 44. The driver 73 cooperates with fins 76 on the bottom of the fan 35 to rotate the fan 35 with the shaft 44.

As shown in FIG. 6, the fan 35 has four of the fins 76 equally angularly spaced from each other. The driver 73 is disposed between each adjacent pair of the fins 76.

The fan 35 has a hub 77 to receive the vertical shaft 44. The fan 35 is formed of a suitable plastic such as polypropylene, for example, and has the hub 77 resting on the upper end of the driver 73 as shown in FIG. 2.

As shown in FIG. 6, the fan 35 has four equally angularly spaced walls or dividers 78, which are spaced 45° from the adjacent fins 76, extending upwardly from a base or bottom wall 79. Thus, as the material falls from the hopper 11 onto the fan 35, it falls onto an area of the base 79. The rotation of the fan 35 flings the material from the fan 35 with the upstanding walls 78 directing the material as it is flung from the fan 35.

Figure 2:
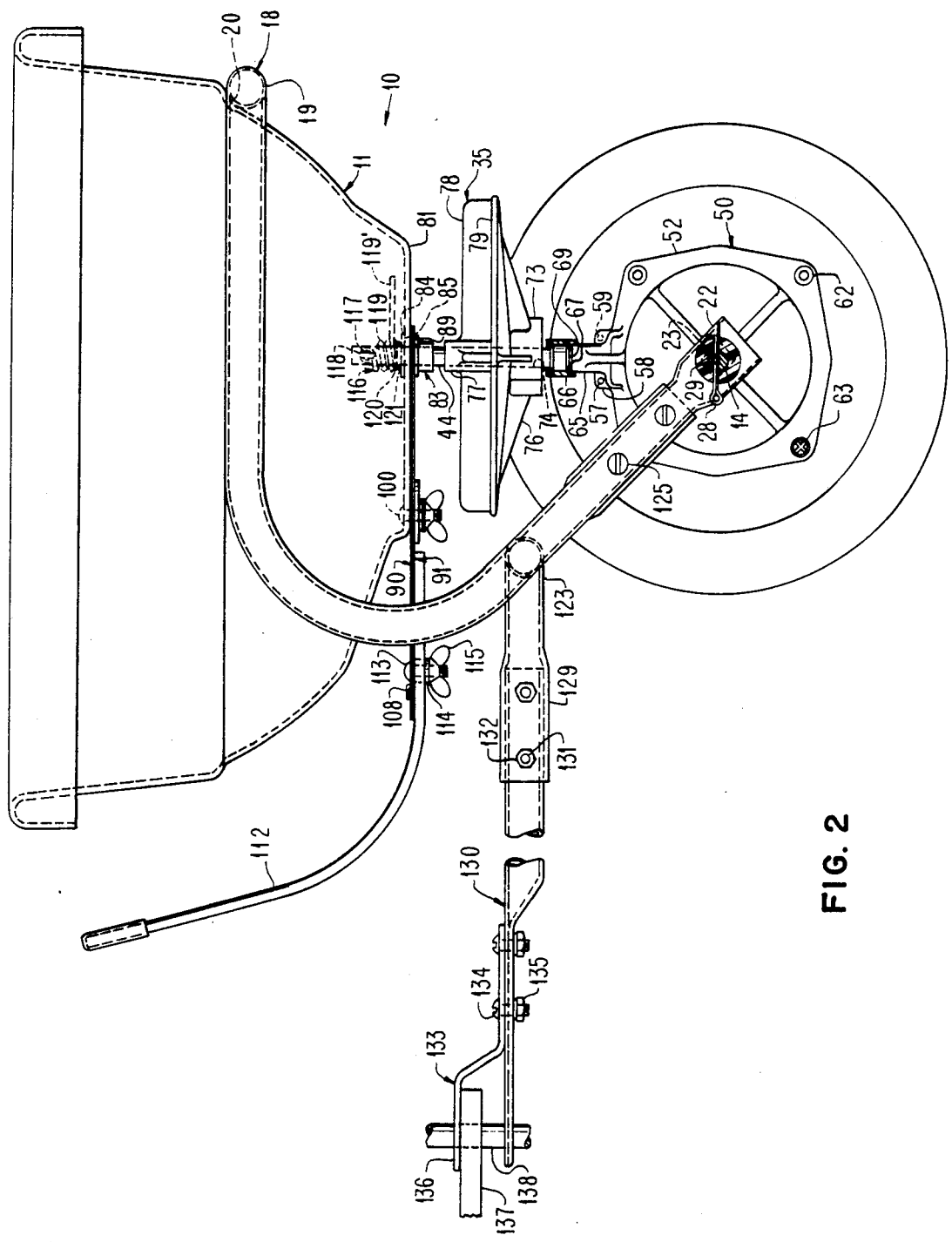
FIG. 2 is a side elevational view, partly in section, of the material spreader of FIG. 1 with the material spreader having an arrangement for being pulled and taken along line 2—2 of FIG. 1.

The material falls from the hopper 11 (see FIG. 3) through an opening 80 in its bottom wall 81, which is substantially flat as shown in FIGS. 1 and 2. The bottom wall 81 has a square shaped opening 82 (see FIG. 3) therein to receive the upper end of the shaft 44 and a bearing 83 for the shaft 44.

Figure 7:
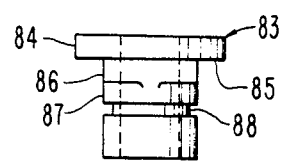
FIG. 7 is a side elevational view of a bearing for rotatably supporting a shaft within the hopper of the material spreader of FIG. 1.
Figure 8:
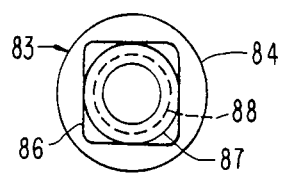
FIG. 8 is a bottom plan view of the bearing of FIG. 7.

As shown in FIGS. 7 and 8, the bearing 83 includes an upper circular flange 84 having its bottom surface 85 resting on the inner surface of the bottom wall 81 (see FIGS. 1 and 2). The bearing 83 (see FIGS. 7 and 8), which is formed of a suitable plastic so as to not require any lubrication, has a square shaped portion 86 beneath, the circular flange 84 and extending through the square shaped opening 82 (see FIG. 3) in the bottom wall 81 of the hopper 11. The bearing 83 (see FIGS. 7 and 8) has a circular shaped portion 87 beginning beneath the square shaped portion 86 so that only the square shaped portion 86 is disposed in the square shaped opening 82 (see FIG. 3) in the bottom wall 81 of the hopper 11. The circular shaped portion 87 (see FIGS. 7 and 8) of the bearing 83 has a groove 88 formed in its circumference to receive a snap ring 89 (see FIG. 2) for holding a gate 90 and a shutter 91 on the circular shaped portion 87 (see FIGS. 7 and 8) of the bearing 83 beneath the outer surface of the bottom wall 81 (see FIG. 3) of the hopper 11.

Figure 9:
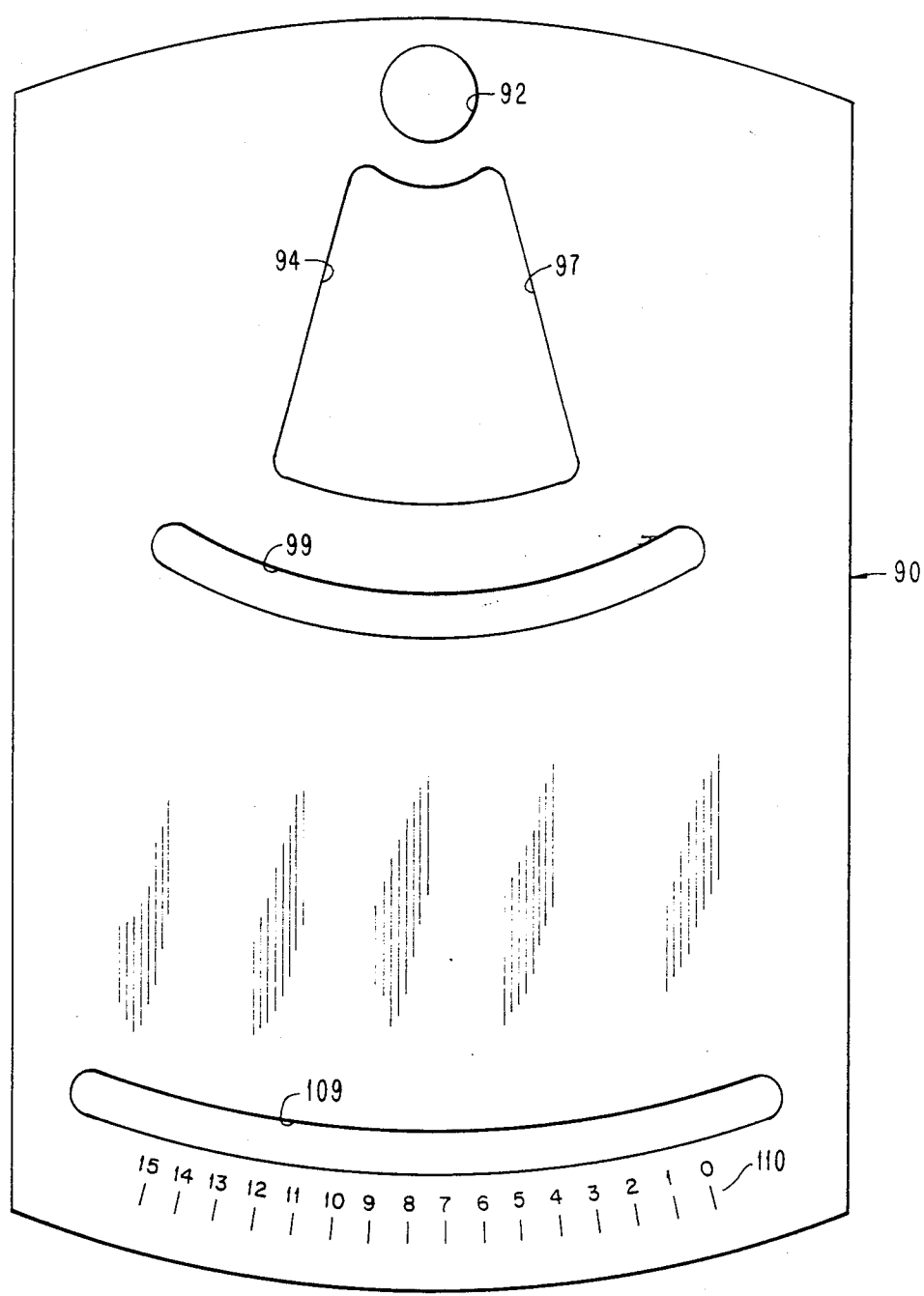
FIG. 9 is a top plan view of a gate of the material spreader of FIG. 1 for controlling the spread pattern of the material.

As shown in FIG. 9, the gate 90 has a circular shaped opening 92, which is adjacent one end, with a slightly larger diameter than the circular shaped portion 87 (see FIGS. 7 and 8) of the bearing 83 for a loose fit therearound. This allows the gate 90 (see FIG. 3) to pivot about the axis of the vertical shaft 44.

Figure 10:
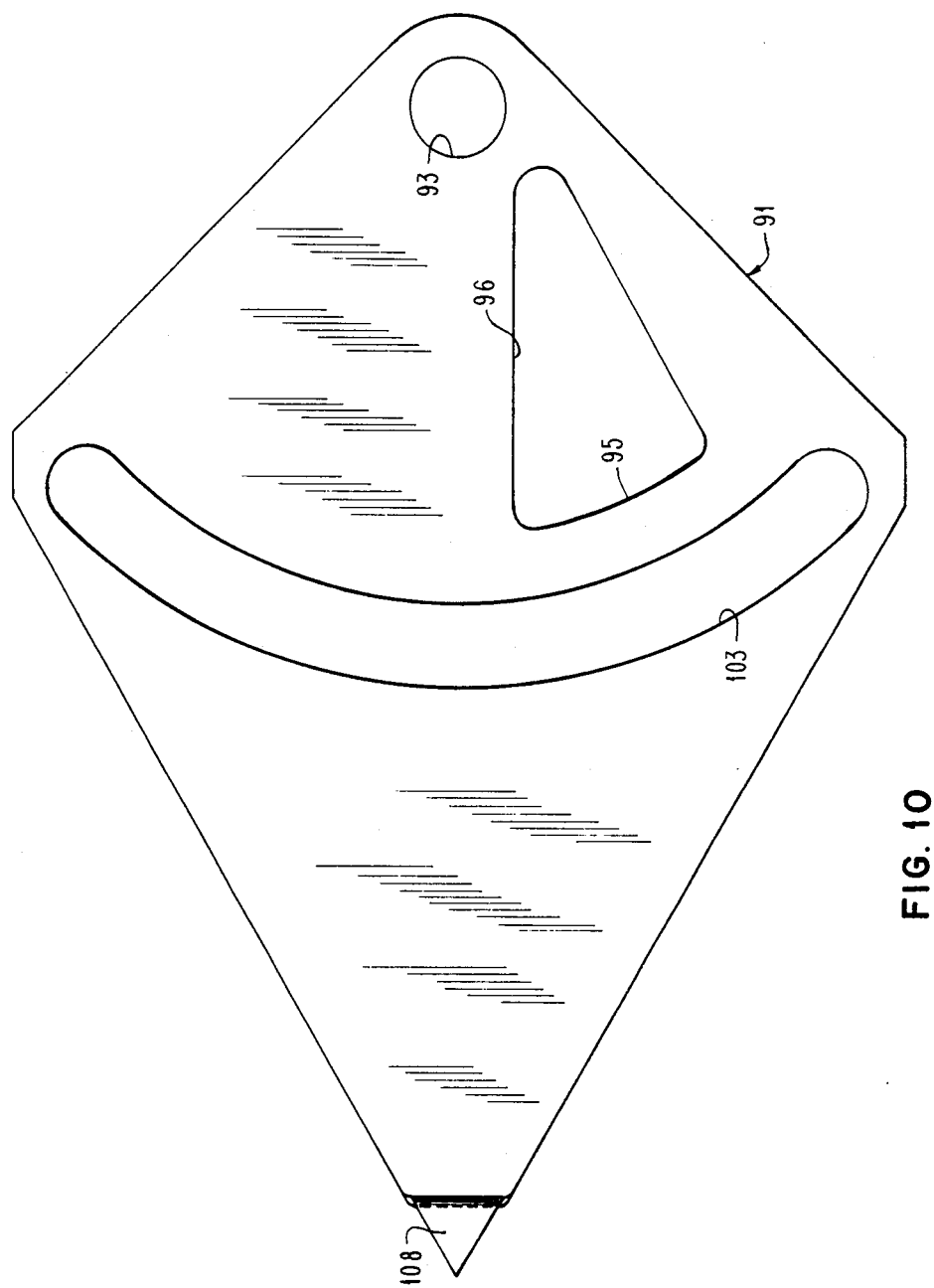
FIG. 10 is a top plan view of a shutter of the material spreader of FIG. 1 for controlling the rate of flow of material.

As shown in FIG. 10, the shutter 91 has a circular shaped opening 93, which is adjacent one end, with a slightly larger diameter than the circular shaped portion 87 (see FIGS. 7 and 8) of the bearing 83 for a loose fit therearound. This enables the shutter 91 (see FIG. 3) to also pivot about the axis of the vertical shaft 44 so that the gate 90 and the shutter 91 pivot about the same axis.

The gate 90 (see FIG. 9) has an opening 94 of a selected size therein for cooperation with the opening 80 (see FIG. 3) in the bottom wall 81 of the hopper 11 to control where the material flows from the opening 80 to the fan 35 (see FIG. 2) so as to control the spread pattern. The opening 94 (see FIG. 9) is substantially symmetrically disposed relative to the longitudinal axis of the gate 90.

As shown in FIG. 3, the opening 94 in the gate 90 has its outer curved surface with the same radius as the outer curved surface of the opening 80 in the bottom wall 81 of the hopper 11 and its inner curved surface with the same radius as the inner surface of the opening 80 in the bottom wall 81 of the hopper 11. Thus, the opening 94 in the gate 90 is moved relative to the opening 80 to control the portion of the opening 80 through which the material flows from the hopper 11 to the fan 35 (see FIG. 2).

The shutter 91 (see FIG. 10) has an opening 95 of a selected size therein for cooperation with the opening 94 (see FIG. 3) in the gate 90 to control the flow rate of material through the opening 94 in the gate 90. As shown in FIG. 10, the opening 95 is disposed on one side of the longitudinal axis of the shutter 91.

As shown in FIG. 3, the opening 95 has its outer curved surface with the same radius as the outer curved surface of the opening 94 in the gate 90. The opening 95 has its inner curved surface formed to cooperate with an arc at either end of the inner curved surface of the opening 94 in the gate 90.

Therefore, when the shutter 91 is disposed in the position of FIG. 3, a straight side edge 96 of the opening 95 in the shutter 91 cooperates with a straight side edge 97 of the opening 94 in the gate 90 to provide an opening 98 therebetween through which the material flows from the hopper 11. When the side edge 96 of the opening 95 in the shutter 91 approaches the side edge 97 of the opening 94 in the gate 90 as the shutter 91 is pivoted counterclockwise in FIG. 3, the size of the opening 98 decreases to reduce the flow rate. The shutter 91 can be pivoted counterclockwise in FIG. 3 to a position in which the opening 98 no longer exists so that no flow can occur from the hopper 11.

Figure 12:
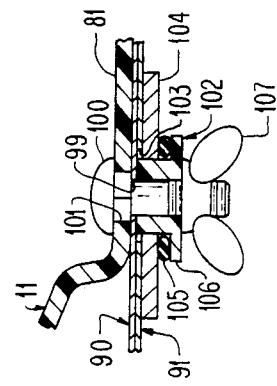
FIG. 12 is an enlarged fragmentary sectional view of a portion of the material spreader of FIG. 1 and showing the structure for locking the gate in position to the base of the hopper while simultaneously applying pressure against the shutter to prevent undesirable vibrational movement of the shutter from a preset open or closed position.

The pivoting of the gate 90 about the axis of the shaft 44 is limited by a first arcuate slot 99 (see FIG. 9) in the gate 90 receiving a carriage bolt 100 (see FIG. 2), which is supported by the hopper 11. The carriage bolt 100 extends through a square shaped opening 101 (see FIG. 3) in the bottom wall 81 of the hopper 11 and the first arcuate slot 99 in the gate 90 into a shoulder bushing 102 (see FIG. 12). The shoulder bushing 102 is disposed within an arcuate slot 103 , (see FIG. 3) in the shutter 91 and bears against the bottom surface of the gate 90 as shown in FIG. 12. As shown in FIG. 3, the arcuate slot 103 is substantially larger in both its arcuate length and its width with respect to the first arcuate slot 99 in the gate 90. The shoulder bushing 102 (see FIG. 12) does not have a tight fit in the arcuate slot 103 (see FIG. 3) in the shutter 91.

As shown in FIG. 12, a washer 104 surrounds the shoulder bushing 102 and bears against the bottom surface of the shutter 91. An O-ring 105 is disposed between the bottom of the washer 104 and a flange 106 of the shoulder bushing 102. A wing nut 107 cooperates with the carriage bolt 100 to hold the O-ring 105 against the washer 104 and the washer 104 against the bottom of the shutter 91. Tightening of the wing nut 107 on the carriage bolt 100 locks the gate 90 in the position in which it is desired for the gate 90 to be retained to control the spread pattern. Because of the arcuate slot 103 (see FIG. 3) being larger than the shoulder bushing 102 (see FIG. 12), the shutter 91 is not locked so that it is free to be moved relative to the gate 90, which is held against movement because of the shoulder bushing 102 bearing against the gate 90. However, the force applied by the O-ring 105 (see FIG. 12) through the washer 104 to the shutter 91 keeps the shutter 91 from vibrating out of position after it is moved to the desired position.

The shutter 91 (see FIG. 10) has a pointer 108 on one end extending through a second arcuate slot 109 (see FIG. 9) in the gate 90. The pointer 108 (see FIG. 10) cooperates with indicia 110 (see FIG. 9), which are spaced 2° from each other, on the upper surface of the gate 90.

Each of the indicia 110 has a numeral to indicate the relative amount of flow. The numerals of the indicia 110 range from zero to fifteen so that when the pointer 108 (see FIG. 10) on the shutter 91 is aligned with the one of the indicia 110 (see FIG. 9) having the numeral zero, there is no flow from the hopper 11 (see FIG. 3) because the opening 95 in the shutter 91 is completely blocked by the overlying gate 90. When the pointer 108 is aligned with the one of the indicia 110 having the numeral fifteen, the maximum flow rate occurs because the opening 95 is completely disposed within the confines of the opening 94 and no portion of the opening 95 is blocked by the gate 90. The shutter 91 is pivoted about the axis of the shaft 44 by a handle 112 (see FIG. 2), which is secured by suitable means such as welding, for example, to the bottom surface of the shutter 91.

Figure 13:
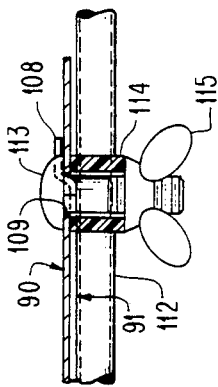
FIG. 13 is an enlarged fragmentary sectional view of a portion of the material spreader of FIG. 1 and showing the structure cooperating with the shutter of FIG. 10 to hold the shutter and taken along line 13—13 of FIG. 3.

A carriage bolt 113 extends through the second arcuate slot 109 (see FIG. 3) in the gate 90. The carriage bolt 113, which is prevented from rotating in the second arcuate slot 109 by its square neck extending through the second arcuate slot 109, has a hollow cylindrical bushing 114 (see FIG. 13) mounted thereon and abutting the bottom surface of the gate 90 when a wing nut 115 is tightened on the carriage bolt 113. This retains the carriage bolt 113 in any position to which it is moved within the second arcuate slot 109 (see FIG. 3) in the gate 90.

The carriage bolt 113 (see FIG. 13) is positioned within the second arcuate slot 109 (see FIG. 3) in the gate 90 so that the bushing 114 (see FIG. 13) engages the shutter 91 after the shutter 91 has been moved to the desired position for the selected flow rate. Accordingly, the bushing 114 in cooperation with the force applied to the shutter 91 from the O-ring 105 (see FIG. 12) holds the shutter 91 (see FIG. 13) from moving.

Furthermore, the bushing 114 prevents any movement of the shutter 91, after the shutter 91 has been moved to the desired position, beyond this desired position where the flow rate would increase. Thus, any inadvertent movement of the shutter 91 will only decrease the flow rate. This insures that an undesired amount of fertilizer, for example, which could damage the area being fertilized, would not be supplied if tne shutter 91 should be inadvertently moved because the shutter 91 can only be moved to reduce the flow rate.

The upper end of the shaft 44 (see FIG. 2) has an agitator 116 attached thereto for rotation therewith within the hopper 11 to agitate the material within the hopper 11. The agitator 116, which is a wire, has one end 117 (see FIG. 1) formed as a loop to receive a cotter pin 118 (see FIG. 2), which extends through a passage in the vertical shaft 44 adjacent the upper end of the vertical shaft 44. The agitator 116 has a coiled portion 119 extending from the end 117 and surrounding the vertical shaft 44 with the bottom end of the coiled portion 119 terminating in an extending end 119' (see FIG. 2). The bottom of the coiled portion 119 rests on a washer 120, which is supported on an O-ring 121. The O-ring 121 rests on the upper surface of the circular flange 84 of the shoulder bushing 83.

Figure 11:
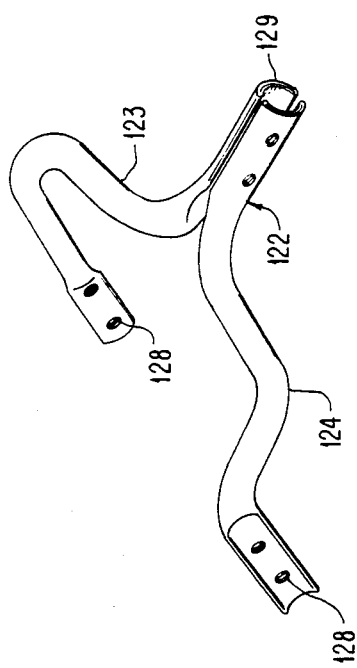
FIG. 11 is a perspective view of a tubular support of the material spreader for supporting means for pulling or pushing the material spreader.

As previously mentioned, the material spreader 10 can be either pulled or pushed. The material spreader 10 has a tubular support 122 (see FIG. 1), which includes a pair of offset tubes 123 (see FIG. 11) and 124. Each of the offset tubes 123 and 124 of the tubular support 122 is attached adjacent one end by screws 125 (see FIG. 1) and nuts 126 to the hopper support 18 adjacent one of the ends 22 of the hopper support 18. The screws 125 extend through circular shaped openings 127 (see FIG. 4) in the hopper support 18 and circular shaped openings 128 (see FIG. 11) in each of the offset tubes 123 and 124 in semi-circular portions thereof fitting around the hopper support 18 (see FIG. 4).

The tubes 123 (see FIG. 11) and 124 of the tubular support 122 have their other ends, which are semi-circular, cooperating with each other to provide a hollow cylindrical portion 129, which is substantially horizontal when the offset tubes 123 and 124 merge. When the material spreader 10 is to be pulled, one end of a tow bar 130 (see FIG. 2) is disposed within the hollow cylindrical portion 129 of the tubular support 122 and retained therein by screws 131 and nuts 132. The semi-circular ends of the offset tubes 123 (see FIG. 11) and 124 forming the hollow cylindrical portion 129 of the tubular support 122 are held against the tow bar 130 (see FIG. 2) in surrounding relation thereto by the screws 131 and the nuts 132.

The tow bar 130, which is a hollow tube flattened at its outer end, has a clevis 133 attached to its outer end by screws 134 and nuts 135. The clevis 133 has a portion 136 spaced from the tow bar 130 to enable a draw bar 137 of a suitable pulling means such as a tractor, for example, to be positioned beneath the clevis 136 and attached to the tow bar 130 and the portion 136 of the clevis 133 by a connecting pin 138.

Figure 14:
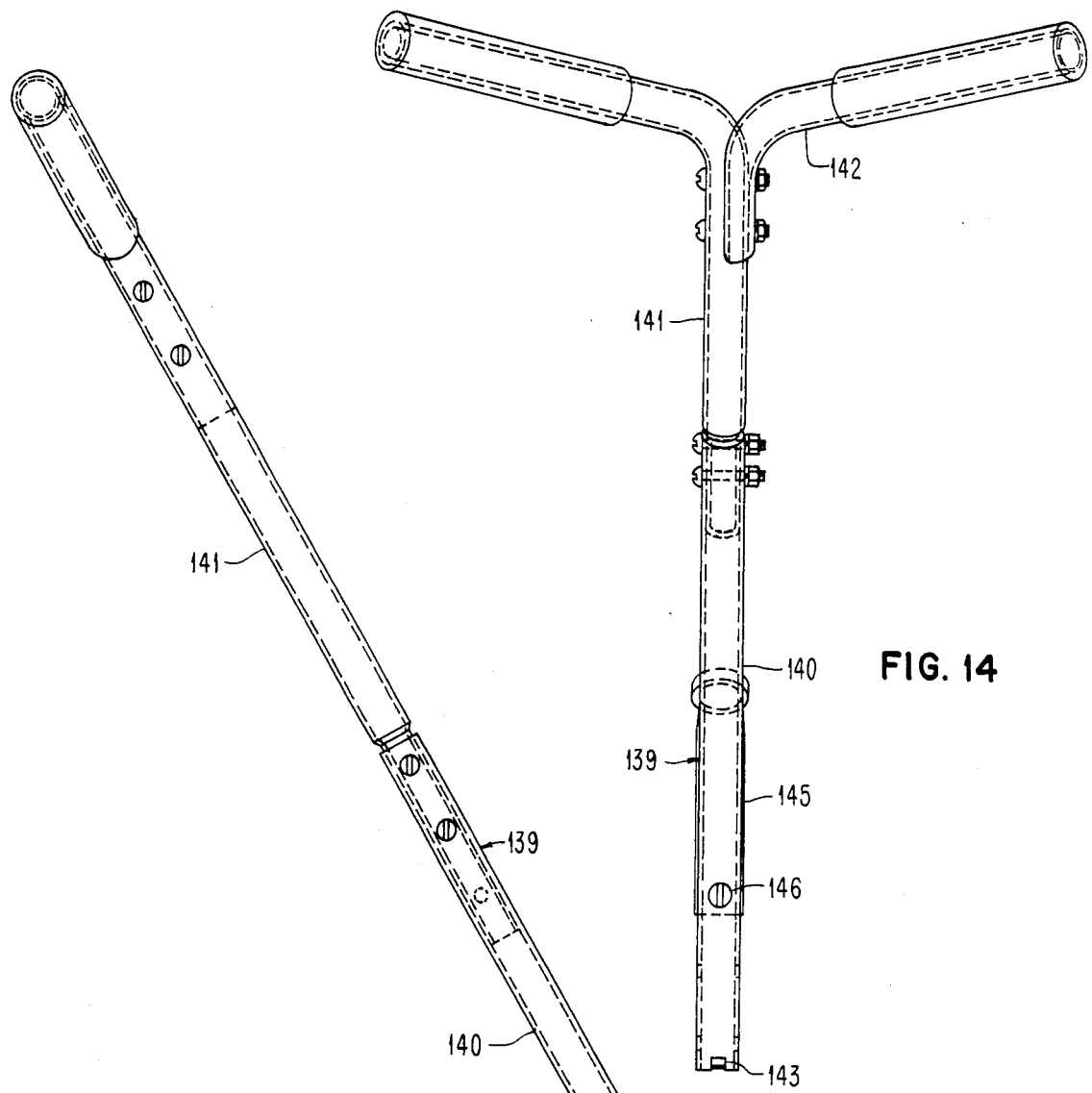
FIG. 14 is a top plan view of a push bar and support stand used with the material spreader of FIG. 1 when the material spreader is being pushed.

Instead of pulling the material spreader 10, it can be pushed. In this arrangement, the tow bar 130 is replaced by a push bar 139 (see FIGS. 14 and 15), which includes a lower tubular portion 140 secured to an upper tubular portion 141. The upper tubular portion 141 is formed at its upper end with one portion of a handle of the push bar 139 and has a tubular handle portion 142 attached thereto to form the other portion of the handle of the push bar 139.

The lower end of the tubular portion 140 of the push bar 139 is disposed within the portion 129 (see FIG. 2) of the tubular support 122 and retained therein by the screws 131 and the nuts 132 in the same manner as the tow bar 130 is attached. Thus, with the push bar 139

(see FIGS. 14 and 15) employed, the material spreader 10 (see FIG. 2) is pushed and the fan 35 will rotate in the opposite direction (clockwise in FIG. 6) from that when the material spreader 10 is pulled.

The lower end of the tubular portion 140 (see FIGS. 14 and 15) of the push bar 139 has a pair of diametrically disposed tabs 143 at its end for disposition between the semi-circular ends of the tubes 123 (see FIG. 11) and 124 forming the hollow cylindrical portion 129. The semi-circular ends of the tubes 123 and 124 do not touch so that the tabs 143 (see FIGS. 14 and 15) prevent any relative rotation of the tubular portion 140 with respect to the hollow cylindrical portion 129 (see FIG. 11).

Figure 15:
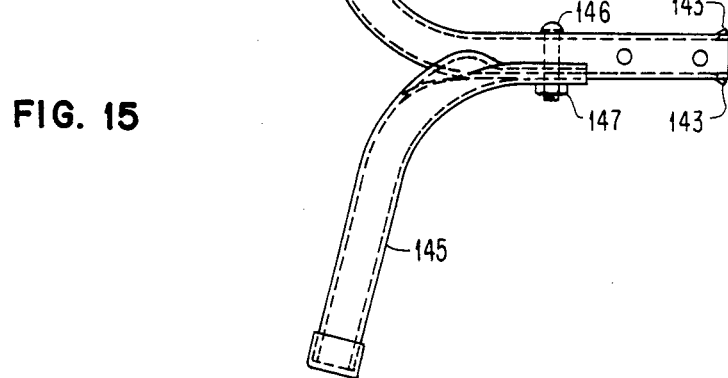
FIG. 15 is a side elevational view of the push bar and support stand of FIG. 14.

As shown in FIG. 15, the material spreader 10 has a tubular support stand 145 attached to the push bar 139 by a screw 146 and a nut 147. The stand 145 supports the push bar 139 when the push bar 139 is not being held.

To obtain the same spread pattern when the fan 35 (see FIG. 6) is rotating clockwise due to the material spreader 10 (see FIG. 3) being pushed as was obtained when the material spreader 10 is being pulled, it is necessary to pivot the gate 90 about the axis of the shaft 44. The shutter 91 will be carried with the gate 90 so that the flow rate will remain the same. If the shutter 91 should fail to follow the gate 90 for any reason, the shutter 91 can be moved by the handle 112 (see FIG. 2) until the shutter 91 abuts the bushing 114 (see FIG. 13).

Because of the opening 95 (see FIG. 10) in the shutter 91 being located on one side of the longitudinal axis of the shutter 91, the location of the opening 95 for the maximum flow rate from the hopper 11 (see FIG. 3) with the gate 90 in its maximum right position (when viewed from the front of the material spreader 10) is substantially to the right of a line passing through the axis of the shaft 44 and the center of the carriage bolt 100. However, when the gate 90 is in its maximum left position (as viewed from the front of the material spreader 10) and the opening 95 in the shutter 91 is positioned for the maximum flow rate from the hopper 11, the opening 95 in the shutter 91 is bisected by a line passing through the axis of the shaft 44 and the center of the carriage bolt 100. Therefore, the same spread pattern is not obtained when moving the gate 90 from one of its maximum positions to the other. Thus, this change in the position of the opening 95 in the shutter 91 relative to a line passing through the axis of the shaft 44 and the center of the carriage bolt 100 must be considered when pivoting the gate 90 about the axis of the snaft 44 to obtain the same spread pattern when the material spreader 10 is being pushed rather than being pulled.

Furthermore, it should be understood that the material falling from the hopper 11 through the opening 80 will strike the surface area of the fan 35 (see FIG. 2) closer to its center when the material spreader 10 is being pulled than when it is being pushed. This is because there is a slight advancement of the material spreader 10 to the left in FIGS. 2 and 3 during the very short time interval required for the material to fall from the hopper 11 to the fan 35. This results in the center of the fan 35 moving toward the falling material.

When the material spreader 10 is pushed, the material from the hopper will strike the surface area of the fan 35 farther from its center than where the material falls through the opening 80 (see FIG. 3) in the bottom wall 81 of the hopper 11. This is because there is a slight advancement of the material spreader 10 to the right in FIGS. 2 and 3 during the very short time interval that occurs between the material leaving the hopper 11 and striking the surface area of the fan 35 (see FIG. 2). This results in advancing the center of the fan 35 away from the falling material.

Therefore, the spread pattern is affected by the direction of motion of the material spreader 10. That is, shifting of the gate 90 from one side of a line passing through the center of the shaft 44 and the carriage bolt 100 to the other side the same amount would not produce the same spread pattern for pulling or pushing of the material spreader 10.

When the material spreader 10 is being pulled, centering of the spread pattern of the material is obtained through positioning the gate 90 (see FIG. 3) so that the opening 94, which cooperates with the opening 80 in the bottom wall 81 of the hopper 11, is in its position closest to the wheel 16. When the gate 90 is positioned so that the opening 94 is its position closest to the wheel 15, the material will be spread to the left side of the spreader 10 in the direction of travel.

When the spreader 10 is being pushed, the material is distributed forward of the spreader 10. To obtain centering of the spread pattern of the material when the spreader 10 is being pushed, the gate 90 is positioned so that the opening 94 is in its position closest to the wheel 15. When the gate 90 is positioned so that the opening 94 is in its position closest to the wheel 16, the material will be spread in a pattern towards the wheel 15. This is to the left side of the spreader 10 in the direction of travel as it is being pushed.

Considering the operation of the material spreader 10 of the present invention, the gate 90 is pivoted about the axis of the shaft 44 relative to the opening 80 in the bottom wall 81 of the hopper 11 to determine the surface area of the fan 35 (see FIG. 6) that will be contacted by the material as it falls through the opening 80 (see FIG. 3) in the bottom wall 81 of the hopper 11 to the fan 35 (see FIG. 2). This will depend on the direction of rotation of the shaft 44 with this being determined by whether the material spreader 10 is pulled or pushed and the desired spread pattern. The shaft 44 rotates counterclockwise (as viewed in FIG. 3) when the material spreader 10 is pulled and clockwise when the material spreader 10 is pushed.

When the gate 90 is in the desired position for the selected spread pattern and the direction of rotation of the fan 35 (see FIG. 2), the wing nut 107 (see FIG. 12) is tightened on the carriage bolt 100 to lock the gate 90 in the desired position. This tightening of the wing nut 107 also causes a force to be applied to the shutter 91 through the washer 104 to prevent any vibration of the shutter 91 after the shutter 91 is moved to its desired position but does not prevent the shutter 91 from being moved by moving the handle 112 (see FIG. 2). However, it does enable the shutter 91 to normally be retained in its desired position through the bushing 114 (see FIG. 13).

After the spread pattern has been determined through positioning the gate 90 relative to the opening 80 (see FIG. 3) in the bottom, wall 81 of the hopper 11, the rate of flow of material from the hopper 11 is selected through pivoting the shutter 91 about the axis of the shaft 44. This determines the size of the opening 98.

The location of the shutter 91 is selected through positioning the pointer 108 relative to the indicia 110. The carriage bolt 113 (see FIG. 13) is then fixed in the second arcuate slot 109 (see FIG. 3) in the gate 90 by tightening the wing nut 115 (see FIG. 13) so that the bushing 114 engages the shutter 91 and in conjunction with the tightening of the wing nut 107 (see FIG. 12) holds the shutter 91 against movement. The bushing 114 (see FIG. 13) prevents the shutter 91 from moving beyond the desired position.

If it is desired to change the spread pattern of the material spreader 10 without changing the flow rate, it is only necessary to release the wing nut 107 (see FIG. 12) and pivot the gate 90 about the axis of the shaft 44 (see FIG. 3). The shutter 91 will be moved with the gate 90 during such movement becasue of the force exerted on the shutter 91 through the washer 104 (see FIG. 12).

If it is desired to only change the flow rate, the shutter 91 (see FIG. 3) is pivoted about the axis of the shaft 44 through moving the handle 112. The wing nut 107 (see FIG. 12) is not released during such pivotal movement of the shutter 91 since tightening of the wing nut 107 only locks the gate 90, not the shutter 91, against pivotal movement. Of course, it is necessary to release the wing nut 115 (see FIG. 13) to shift the position of the carriage bolt 113 in the second arcuate slot 109 (see FIG. 3) in the gate 90.

It should be understood that the width of material being spread depends upon the speed of movement of the material spreader 10 and the density of the material being spread. For example, when spreading a light density material such as Bluegrass see, for example, the maximum spread would be five feet to six feet irrespective of the speed of the material spreader 10. With the material spreader 10 moving at three miles per hour, for example, a heavier density material such as 10-10-10 fertilizer would be spread for at least ten feet. A high density material such as pelletized fertilizer, for example, might be spread fifteen to twenty feet when the material spreader 10 is moved at three miles per hour. Therefore, the density of the material being spread is a factor in how wide is the spread of the material. Of course, wind also can be a factor in the width of the spread pattern and has more effect on the lighter density materials.

An advantage of this invention is that centering of a desired spread pattern of material is obtained irrespective of whether a material spreader is pulled or pushed. Another advantage of this invention is that the spread pattern is controlled separately from the flow rate of the material. A further advantage of this invention is that the spread pattern can be changed without affecting the flow rate. Still another advantage of this invention is to direct the flow of material off center to one side, the left of the direction of travel of the material spreader, when pulling or pushing so as to be able to direct material beneath shrubs, trees, or the like that cannot have the spreader pass thereover.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:

1. A material spreader for spreading material in a specific pattern at a selected flow rate including:
    a hopper for containing material to be spread;
    support means to support said hopper for movement along the ground through either pushing or pulling;
    spreading means disposed beneath said hopper to receive material for spreading;
    rotating means to rotate said spreading means at a selected rate of rotation as said support means is moved along the ground;
    said hopper having an opening in its bottom for material to flow therethrough from said hopper to said spreading means;
    control means to control the portion of said opening in said hopper through which the material flows;
    said control means including:
        first means pivotally mounted for movement about a pivot axis to control the portion of said opening in said hopper that is open for material to flow therethrough from said hopper to control the spread pattern;
        and second means pivotally mounted for movement about the pivot axis to control the size of the portion of said opening in said hopper that is open by the position of said first means to control the flow rate therethrough;
    said first means comprising a gate having an opening therein of a selected size smaller than said opening in said hopper, said gate being mounted for pivotal movement about the pivot axis to move said opening in said gate relative to said opening in said hopper to control the spread pattern of material from said hopper by controlling the portion of said opening in said hopper through which the material flows;
    said second means comprising a shutter having an opening therein of a selected size smaller than said opening in said gate, said shutter being pivotally mounted for pivotal movement about the pivot axis independently of said gate to move said opening in said shutter relative to said opening in said gate to control the rate of flow of material from said hopper through said opening in said gate;
    locking means to lock said gate to said hopper to retain said gate in any position to which it is moved;
    limiting means to limit pivoting of said gate about the pivot axis;
    holding means to hold said shutter in the position to which it is moved while preventing pivoting of said shutter about the pivot axis beyond a desired limit;
    said limiting means including:
        a first arcuate slot in said gate formed on a first radius having the pivot axis as its center;
        and means supported by said hopper and disposed in said first arcuate slot in said gate to limit pivoting of said gate about the pivot axis to the arcuate length of said first arcuate slot in said gate;
    said holding means including:
        a second arcuate slot in said gate formed on a second radius having the pivot axis as its center;
        and means supported by said gate and disposed in said second arcuate slot in said gate, said supported means being selectively movable to any portion of said second arcuate slot in said gate and being retained at any position to which it is moved;
    and means carried by said shutter and disposed in said second arcuate slot in said gate to disposed in said supported means in said second arcuate slot in said gate so that said shutter is held in the position to which it is moved while pivoting of said shutter about the pivot axis beyond a desired limit is prevented.

2. The material spreader according to claim 1 in which said locking means includes means cooperating with said supported means of said limiting means to lock said gate to said hopper without preventing pivoting of said shutter relative to said gate.

3. The material spreader according to claim 2 in which:
said support means includes wheel means to enable movement along the ground;
connecting means connects said wheel means to said rotating means to cause rotation of said rotating means;
and said rotating means includes:
a driver driven by rotation of said wheel means;
and means on said spreading means engageable by said driver to cause rotation of said spreading means in a first direction when said wheel means rotates in one direction and in a second direction opposite to the first direction when said wheel means rotates in the opposite direction.

4. The material spreader according to claim 3 in which said supported means of said limiting means includes means to exert a force on said shutter to cause said shutter to move with said gate when said gate is pivoted without affecting the relative position of said shutter with respect to said gate.

5. The material spreader according to claim 2 in which said supported means of said limiting means includes means to exert a force on said shutter to cause said shutter to move with said gate when said gate is pivoted without affecting the relative position of said shutter with respect to said gate.

6. A material spreader for spreading material in a specific pattern at a selected flow rate including:
a hopper for containing material to be spread;
support means to support said hopper for movement along the ground through either pushing or pulling;
spreading means disposed beneath said hopper to receive material for spreading;
rotating means to rotate said spreading means at a selected rate of rotation as said support means is moved along the ground;
said hopper having an opening in its bottom for material to flow therethrough from said hopper to said spreading means;
control means to control the portion of said opening in said hopper through which the material flows;
said control means including:
first means pivotally mounted for movement about a pivot axis to control the portion of said opening in said hopper that is open for material to flow therethrough from said hopper to control the spread pattern;
and second means pivotally mounted for movement about the pivot axis to control the size of the portion of said opening in said hopper that is open by the position of said first means to control the flow rate therethrough;
said first means comprising a gate having an opening therein of a selected size smaller than said opening in said hopper, said gate being mounted for pivotal movement about the pivot axis to move said opening in said gate relative to said opening in said hopper to control the spread pattern of material from said hopper by controlling the portion of said opening in said hopper through which the material flows;
said second means comprising a shutter having an opening therein of a selected size smaller than said opening in said gate, said shutter being pivotally mounted for pivotal movement about the pivot axis independently of said gate to move said opening in said shutter relative to said opening in said gate to control the rate of flow of material from said hopper through said opening in said gate;
limiting means to limit pivoting of said gate about the pivot axis;
holding means to hold said shutter in the position to which it is moved while preventing pivoting of said shutter about the pivot axis beyond a desired limit;
said limiting means including:
a first arcuate slot in said gate formed on a first radius having the pivot axis as its center;
and means supported by said hopper and disposed in said first arcuate slot in said gate to limit pivoting of said gate about the pivot axis to the arcuate length of said first arcuate slot in said gate;
said holding means including:
a second arcuate slot in said gate formed on a second radius having the pivot axis as its center;
and means supported by said gate and disposed in said second arcuate slot in said gate, said supported means being selectively movable to any portion of said second arcuate slot in said gate and being retained at any position to which it is moved;
and means carried by said shutter and disposed in said second arcuate slot in said gate to engage said supported means in said second arcuate slot in said gate so that said shutter is held in the position ot which it is moved while pivoting of said shutter about the pivot axis beyond a desired limit is prevented.

7. The material spreader according to claim 6 in which:
said support means includes wheel means to enable movement along the ground;
connecting means connects said wheel means to said rotating means to cause rotation of said rotating means;
and said rotating means includes:
a driver driven by rotation of said wheel means;
and means on said spreading means engageable by said driver to cause rotation of said spreading means in a first direction when said wheel means rotates in one direction and in a second direction opposite to the first direction when said wheel means rotates in the opposite direction.

* * * * *

UNITED STATES PATENT AND TRADEMARK OFFICE
CERTIFICATE OF CORRECTION

PATENT NO. : 4,548,362
DATED : October 22, 1985
INVENTOR(S) : Charles W. Doering It is certified that error appears in the above-identified patent and that said Letters Patent is hereby corrected as shown below:

Column 2, line 46, cancel the "comma (,)".

Column 6, line 63, cancel the "comma (,)".

Column 8, line 2, "tne" should read -- the --.

Column 9, line 49, "snaft" should read -- shaft --.

Column 10, line 60, cancel the "comma (,)" (first occurrence).

Column 11, line 11, "becasue" should read -- because --.

Column 11, line 27, "see" should read -- seed --.

Column 12, line 48, "said" should be the start of a new paragraph and indented the same as Column 12, line 45.

Column 12, line 65, cancel "disposed in" and substitute -- engage --.

UNITED STATES PATENT AND TRADEMARK OFFICE
CERTIFICATE OF CORRECTION

PATENT NO. : 4,548,362

DATED : October 22, 1985

INVENTOR(S) : Charles W. Doering

It is certified that error appears in the above-identified patent and that said Letters Patent is hereby corrected as shown below:

Column 13, lines 52 through 56 are indented incorrectly and should read as follows:

-- said control means including:

first means pivotally mounted for movement about a pivot axis to control the portion of said opening in said hopper that is open for material to flow therethrough from said hopper to control the spread pattern; --.

Column 14, line 42, "ot" should read -- to --.

Signed and Sealed this

Twenty-eighth Day of January 1986

[SEAL]

Attest:

DONALD J. QUIGG

Attesting Officer

Commissioner of Patents and Trademarks